(12) United States Patent
Wang et al.

(10) Patent No.: US 11,912,841 B1
(45) Date of Patent: Feb. 27, 2024

(54) PREPARATION METHOD OF MICROPOROUS FOAM MATERIAL WITH ORIENTED CELLS

(71) Applicant: Zhengzhou University, Henan (CN)

(72) Inventors: Xiaofeng Wang, Henan (CN); Yufan Jiang, Henan (CN); Jing Jiang, Henan (CN); Lian Yang, Henan (CN); Yangyang Li, Henan (CN); Qian Li, Henan (CN)

(73) Assignee: Zhengzhou University, Henan (CN)

( * ) Notice: Subject to any disclaimer, the term of this patent is extended or adjusted under 35 U.S.C. 154(b) by 0 days.

(21) Appl. No.: 18/359,836

(22) Filed: Jul. 26, 2023

(30) Foreign Application Priority Data

Oct. 8, 2022 (CN) .......................... 202211222802.8

(51) Int. Cl.
  *C08J 9/228* (2006.01)
  *C08J 9/08* (2006.01)
  *C08J 9/00* (2006.01)

(52) U.S. Cl.
  CPC ............. *C08J 9/228* (2013.01); *C08J 9/0023* (2013.01); *C08J 9/0038* (2013.01); *C08J 9/0085* (2013.01); *C08J 2201/022* (2013.01); *C08J 2323/12* (2013.01); *C08J 2367/03* (2013.01); *C08J 2377/00* (2013.01)

(58) Field of Classification Search
  CPC ........ C08J 9/228; C08J 9/0023; C08J 9/0038; C08J 9/0085; C08J 2201/022; C08J 2323/12; C08J 2367/03; C08J 2377/00
  See application file for complete search history.

(56) References Cited

U.S. PATENT DOCUMENTS 5,863,645 A * 1/1999 Misoo ................ B01D 67/0088
210/321.89

FOREIGN PATENT DOCUMENTS

CN 113085220 A * 7/2021 ............. B29C 70/34

* cited by examiner

*Primary Examiner* — K. Boyle
(74) *Attorney, Agent, or Firm* — JCIPRNET

(57) ABSTRACT

The disclosure relates to the technical field of new foaming materials, in particular to a preparation method of a microporous foam material with oriented cells, which comprises the following steps: (1) melting and mixing raw materials for preparing a polymer composite material, and then carrying out hot stretching to obtain polymer composite fibers; the raw materials comprise a polymer matrix, a fiber-forming phase substance and a processing aid; (2) arranging the polymer composite fibers prepared in the step (1) in the same direction, and performing hot pressing to obtain a polymer composite board with oriented fibers; and (3) carrying out supercritical fluid foaming on the polymer composite board prepared in the step (2) to obtain the microporous foam material with oriented cells.

7 Claims, 3 Drawing Sheets

PREPARATION METHOD OF MICROPOROUS FOAM MATERIAL WITH ORIENTED CELLS

CROSS-REFERENCE TO RELATED APPLICATION

This application claims the priority benefit of Chinese application serial no. 202211222802.8, filed on Oct. 8, 2022. The entirety of the above-mentioned patent application is hereby incorporated by reference herein and made a part of this specification.

BACKGROUND

Field of the Disclosure

The disclosure relates to the technical field of new materials, in particular to a preparation method of a microporous foam material with oriented cells.

Description of Related Art

Nowadays, many methods have been developed for foaming polymers. The performance of conventional polymer microporous foam materials is affected by many factors such as cell size, distribution, and cell structure. Since there are great differences in the thermodynamic properties of the two phases of the polymer and the gas, the polymer foamed materials prepared in a conventional sense have uneven distribution of cells, disordered random distribution of cells, a non-adjustable cell structure and other disadvantages. These structural defects reduce the mechanical properties, heat insulation and sound absorption of polymer foamed materials and restrict the use thereof.

SUMMARY OF THE DISCLOSURE

The purpose of the present disclosure is to provide a preparation method of a microporous foam material with oriented cells.

To realize the purpose of the disclosure, the present disclosure provides as follows.

In the first aspect of the present disclosure, there is provided a preparation method of a microporous foam material with oriented cells, which includes the following steps.

(1) The raw materials for preparing a polymer composite material are melted and mixed and then thermally stretched to obtain polymer composite fibers; the raw materials include a polymer matrix, a fiber-forming phase substance and a processing aid.

(2) The polymer composite fibers prepared in step (1) are arranged in the same direction and then hot-pressed to obtain a polymer composite board with oriented fibers.

(3) The polymer composite board prepared in step (2) is subjected to a supercritical fluid foaming process to obtain a microporous foam material with oriented cells.

According to the above preparation method of a microporous foam material with oriented cells, preferably, the content of the polymer matrix in the raw material is 80 wt % to 99 wt %, and the content of the fiber-forming phase substance is 1 wt % to 20 wt %.

According to the preparation method of a microporous foam material with oriented cells, preferably, the amount of the processing aid is 0.1 wt % to 10 wt % of the total weight of the polymer matrix and the fiber-forming phase substance.

According to the preparation method of a microporous foam material with oriented cells, preferably, in step (3), a temperature of the supercritical fluid foaming process is 130° C. to 165° C., the pressure of the supercritical fluid is 17.90 Mpa to 21.69 Mpa, and the pressure holding treatment time for the supercritical fluid is 0.5 hour to 5 hours.

According to the preparation method of a microporous foam material with oriented cells, preferably, the temperature for melting and mixing in step (1) is 160° C. to 255° C.; the temperature for thermal stretching treatment is 255° C. to 230° C.

According to the preparation method of a microporous foam material with oriented cells, preferably, the temperature for hot-pressing treatment in step (2) is 180° C. to 200° C. More preferably, the hot-pressing treatment is carried out in a vacuum laminator, and the pressure of the vacuum laminator is 3000 kg to 5000 kg.

According to the preparation method of a microporous foam material with oriented cells, preferably, the diameter of the polymer composite fibers is 160 μm to 240 μm.

According to the preparation method of a microporous foam material with oriented cells, preferably, the polymer matrix is polypropylene; more preferably, the MFR of the polypropylene is 25 g/10 min.

According to the preparation method of a microporous foam material with oriented cells, preferably, the fiber-forming phase substance is polyethylene terephthalate or polyamide; more preferably, the polyamide is nylon 6 (PA6).

According to the preparation method of a microporous foam material with oriented cells, preferably, the processing aid is phenoxy polyphosphazene or polyethylene oxide (POE).

According to the preparation method of a microporous foam material with oriented cells, preferably, the raw material also includes an antioxidant, and the amount of the antioxidant is 0.1 wt % to 1 wt % of the total weight of the polymer matrix and the fiber-forming phase substance.

According to the preparation method of a microporous foam material with oriented cells, preferably, the antioxidant is at least one of BASF antioxidant 1010 and BASF antioxidant 168.

According to the preparation method of a microporous foam material with oriented cells, preferably, the thickness of the polymer composite board is 1 mm to 5 mm.

According to the preparation method of a microporous foam material with oriented cells, preferably, the specific operation of foaming supercritical fluid is: the polymer composite board is placed in a closed reaction vessel, and the closed reaction vessel is filled with the supercritical fluid at 130° C. to 155° C. until the pressure in the closed reaction vessel reaches 17.90 Mpa to 21.69 Mpa, the pressure-holding treatment is carried out for 0.5 hour to 5 hours, and then the reaction vessel is depressurized and cooled.

According to the preparation method of a microporous foam material with oriented cells, preferably, the supercritical fluid is carbon dioxide or nitrogen.

According to the preparation method of a microporous foam material with oriented cells, preferably, in step (1), a twin-screw extruder is adopted for melting and mixing, the screw speed of the twin-screw extruder is 75 rad/min, and the speed of the lower hopper of the twin-screw extruder is 3 ad/min to 8 rad/min; the thermal stretching is carried out by using a high-speed roller, and the speed of the high-speed roller is 950 rad/min.

In the second aspect of the present disclosure, there is provided a microporous foam material product with oriented cells prepared by using the preparation method described in the first aspect above.

According to the microporous foam material product with oriented cells, preferably, the diameter of the cells is 3.0 μm to 7.3 μm.

The second aspect of the present disclosure provides the application of the microporous foam material product with oriented cells described in the second aspect above in an oil-absorbing foam.

The effect that the present disclosure obtains is as follows.

(1) The present disclosure uses polymer matrix, fiber-forming phase substance and processing aid as raw materials to prepare polymer composite fibers through melting and mixing extrusion and thermal stretching. During the process of melting extrusion and thermal stretching, the fiber-forming phase substance is stretched in situ, and microfibers with a relatively large length and diameter will be formed inside the polymer composite fiber. Therefore, the polymer fiber prepared by the present disclosure is mainly formed by the polymer matrix and the microfibers formed by fiber-forming phase substance formed in situ. The in-situ fiber-forming microfibers in the polymer composite fibers are thermodynamically incompatible with the polymer matrix. On the contact interface between the two, the cells are very likely to nucleate. Therefore, when supercritical fluid is foamed on a polymer composite board with oriented fibers, the microfibers may serve as the nucleation points of the cells, making the cells grow directionally along the direction of the microfibers to form oriented cells, and finally the polymer foam material with consistent cell orientation and uniform cell size may be obtained.

(2) In the present disclosure, when the polymer composite fibers are subjected to hot-pressing treatment, the hot-pressing temperature is controlled within 180° C. to 200° C. At this temperature, the polymer matrix in the polymer composite fibers will be melted, but the microfibers in the polymer composite fiber will not be melted, thereby ensuring that the microfibers in the formed polymer composite board will not be damaged and deformed, and the orientation of the microfibers will not change, which facilitates the formation of oriented cells during the supercritical fluid foaming process.

(3) The supercritical fluid foaming control of the present disclosure is carried out at a relatively low temperature (130° C. to 155° C.), at which temperature the microfibers in the polymer composite board will not be melted and destroyed. Therefore, during the supercritical fluid foaming process, the orientation of the microfibers in the polymer board does not change, and the cells may be induced to grow directionally along the direction of the microfibers to form oriented cells.

(4) The preparation method of the microporous foam material with oriented cells of the present disclosure is simple, easy to operate, has low cost and high repeatability.

(5) The microporous foam material with oriented cells prepared by the present disclosure has cells arranged in order and in the same direction, with small and uniform cell sizes, good mechanical properties and application prospects, and may be used in oil-absorbing foams.

DESCRIPTION OF EMBODIMENTS

Figure 1:
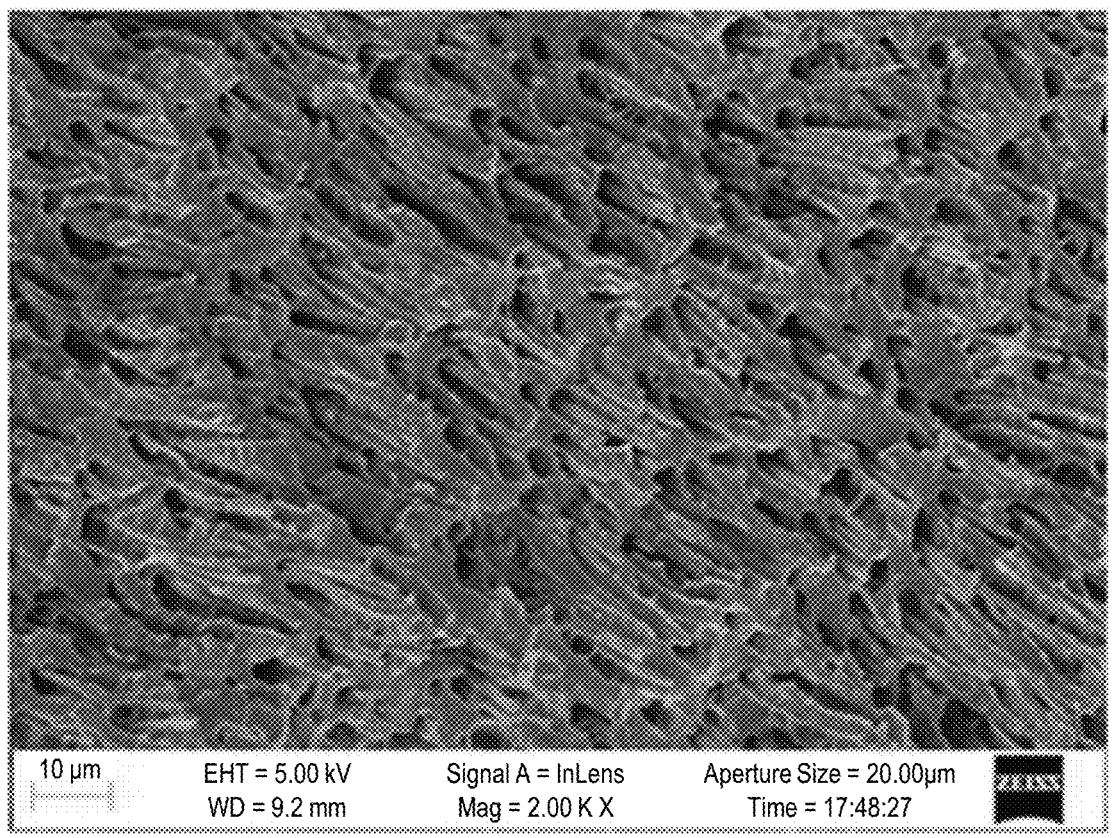
FIG. 1 is a cross-sectional schematic view of a microporous foam material with oriented cells prepared in Example 1 of the present disclosure.

The present disclosure will be described in further detail below through specific examples, but the scope of the present disclosure is not limited thereto.

Example 1

A preparation method of a microporous foam material with oriented cells includes the following steps.

(1) The raw materials for preparing polymer composite material are dried and mixed evenly, melted and mixed through a twin-screw extruder, and then thermally stretched by high-speed rollers and cooled to obtain polymer composite fibers. The diameter of the polymer composite fibers is 160 μm to 240 μm. The temperature of the twin-screw extruder is set at 160° C. to 250° C., the screw speed is 75 rad/min, the speed of the lower hopper is 6 rad/min; the speed of the high-speed roller during thermal stretching is 950 rad/min.

The raw material is composed of a polymer matrix, a fiber-forming phase substance, a processing aid and an antioxidant. The polymer matrix is polypropylene, and the fiber-forming phase substance is polyethylene terephthalate (PET), the processing aid is phenoxy polyphosphazene, and the antioxidant is BASF antioxidant 1010. The content of polypropylene in the raw material is 93 wt %, the content of PET is 7 wt %, the amount of phenoxy polyphosphazene is 3 wt % of the total weight of polypropylene and PET, and the amount of BASF antioxidant 1010 is 1% of the total weight of polypropylene and PET.

(2) The polymer composite fibers prepared in step (1) are arranged in the same direction and put into a film laminator for hot-pressing treatment. The hot-pressing temperature is 190° C. After hot-pressing treatment is carried out, a polymer composite board with oriented fibers on the inside is obtained.

(3) The polymer composite board prepared in step (2) in a closed reaction vessel, and the closed reaction vessel is filled with supercritical fluid (carbon dioxide) until the pressure in the closed reaction vessel reaches 21.69 Mpa. The pressure is maintained for 1 hour at 155° C., and then the reaction vessel is rapidly depressurized and cooled to obtain a microporous foam material with oriented cells.

Example 2

The description of Example 2 is basically the same as Example 1, and the difference between the two is as follows.

In step (1): The content of polypropylene in the raw material is 99 wt %, the content of PET is 1 wt %, the amount of phenoxy polyphosphazene is 10 wt % of the total weight of polypropylene and PET, and the amount of BASF antioxidant 1010 is 0.1% of the total weight of polypropylene and PET.

In step (2): The hot-pressing temperature is 200° C., and a polymer composite board with oriented fibers on the inside is obtained after the hot-pressing treatment.

In step (3): During the supercritical fluid foaming process, the pressure in the closed reaction vessel is 17.9 Mpa, and the pressure is maintained at 165° C. for 2 hours.

Example 3

The description of Example 3 is basically the same as Example 1, and the difference between the two is as follows.

In step (1): The content of polypropylene in the raw material is 80 wt %, the content of PET is 20 wt %, the amount of phenoxy polyphosphazene is 0.1 wt % of the total weight of polypropylene and PET, and the amount of BASF antioxidant 1010 is 0.5% of the total weight of polypropylene and PET.

In step (2): The hot-pressing temperature is 180° C., and a polymer composite board with oriented fibers on the inside is obtained after the hot-pressing treatment.

In step (3): During the supercritical fluid foaming process, the pressure in the closed reaction vessel is 20.0 Mpa, and the pressure is maintained at 130° C. for 5 hours.

Example 4

The description of Example 4 is basically the same as Example 1, and the difference between the two is as follows.

In step (1): The content of polypropylene in the raw material is 90 wt %, the content of PET is 10 wt %, the amount of phenoxy polyphosphazene is 5 wt % of the total weight of polypropylene and PET, and the amount of BASF antioxidant 1010 is 0.8% of the total weight of polypropylene and PET.

In step (2): The hot-pressing temperature is 190° C., and a polymer composite board with oriented fibers on the inside is obtained after the hot-pressing treatment.

In step (3): During the supercritical fluid foaming process, the pressure in the closed reaction vessel is 19.8 Mpa, and the pressure is maintained at 145° C. for 2 hours.

Example 5

The description of Example 5 is basically the same as Example 1, and the difference between the two is as follows.

In step (1): The content of polypropylene in the raw material is 85 wt %, the content of PET is 15 wt %, the amount of phenoxy polyphosphazene is 3 wt % of the total weight of polypropylene and PET, and the amount of BASF antioxidant 1010 is 0.5% of the total weight of polypropylene and PET.

In step (2): The hot-pressing temperature is 200° C., and a polymer composite board with oriented fibers on the inside is obtained after the hot-pressing treatment.

In step (3): During the supercritical fluid foaming process, the pressure in the closed reaction vessel is 21.69 Mpa, and the pressure is maintained at 150° C. for 2 hours.

Example 6

The description of Example 6 is basically the same as Example 1, and the difference between the two is as follows.

In step (1): The content of polypropylene in the raw material is 89 wt %, the content of PET is 11 wt %, the amount of phenoxy polyphosphazene is 2 wt % of the total weight of polypropylene and PET, and the amount of BASF antioxidant 1010 is 1% of the total weight of polypropylene and PET.

Example 7

The description of Example 7 is basically the same as Example 1, and the difference between the two is as follows.

In step (1): The content of polypropylene in the raw material is 95 wt %, the content of PET is 5 wt %, the amount of phenoxy polyphosphazene is 6 wt % of the total weight of polypropylene and PET, and the amount of BASF antioxidant 1010 is 0.8% of the total weight of polypropylene and PET.

Example 8

The description of Example 8 is basically the same as Example 1, and the difference between the two is as follows.

In step (1): The content of polypropylene in the raw material is 93 wt %, the content of PET is 7 wt %, and the amount of phenoxy polyphosphazene is 3 wt % of the total weight of polypropylene and PET.

Example 9

The description of Example 9 is basically the same as Example 1, and the difference between the two is as follows.

In step (1): The fiber-forming phase substance is nylon 6 (PA6), and the processing aid is polyethylene oxide.

In step (3): The temperature for pressure holding treatment is 160° C.

The specific implementation steps of step (3) are: The polymer composite board with oriented microfibers prepared in step (2) is placed in a closed reaction vessel, and the closed reaction vessel is filled with supercritical fluid (carbon dioxide) until the pressure in the closed reaction vessel reaches 21.69 Mpa, the pressure is maintained at 160° C. for 1 hour. Then, the reaction vessel is quickly depressurized and cooled to obtain a microporous foam material with oriented cells.

Comparative Example 1

Comparative Example 1 is basically the same as Example 1, except that the polymer composite fibers are not oriented in step (2), and the polymer composite fibers are randomly placed in a film laminator for hot pressing to obtain the polymer composite board.

The specific operation of step (2) is as follows: The polymer composite fibers prepared in step (1) are randomly and messily placed in a film laminator for hot pressing, the hot pressing temperature is 155° C., and the polymer composite board is obtained after hot pressing.

Figure 2:
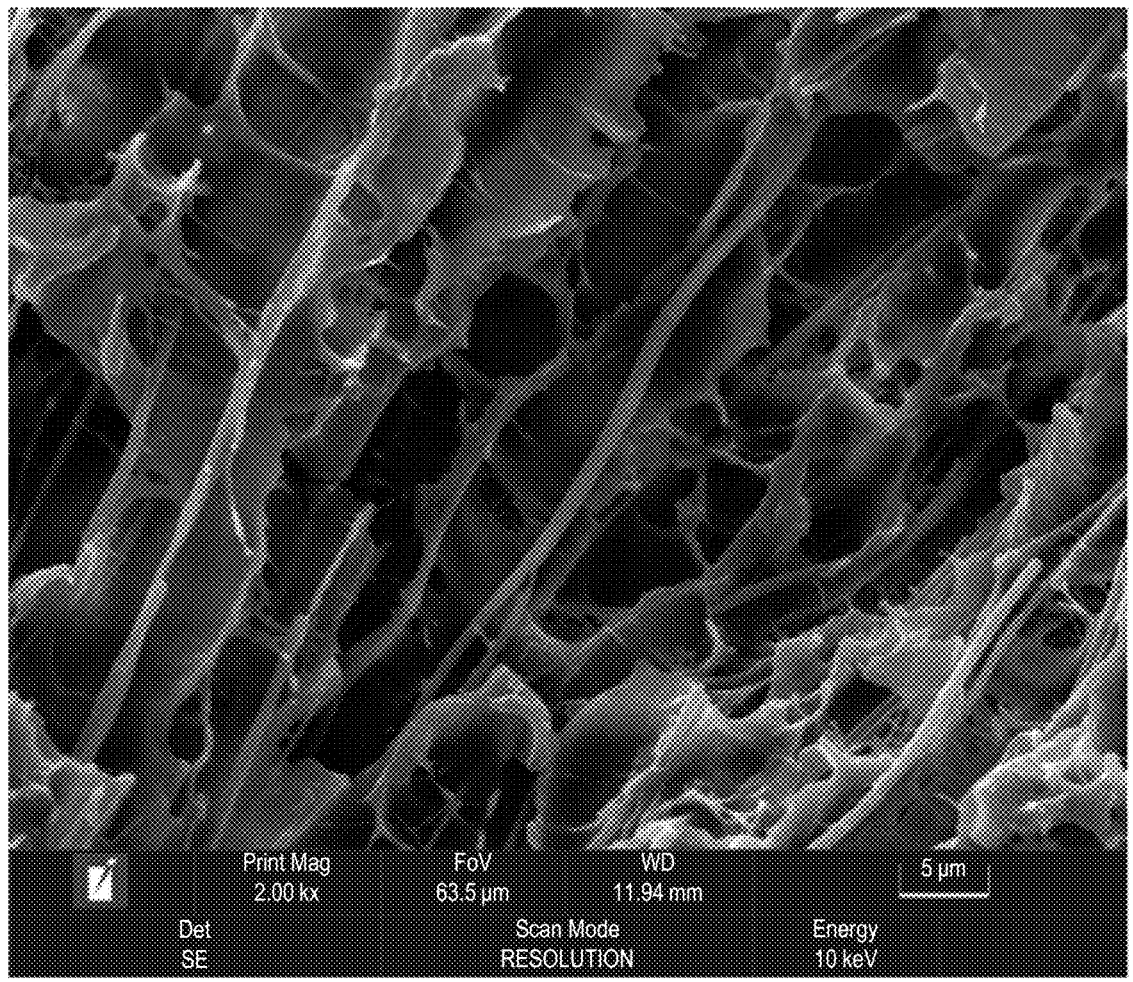
FIG. 2 is a schematic cross-sectional view of a microporous foam material with oriented cells prepared in Example 9 of the present disclosure along the direction of fiber orientation.
Figure 3:
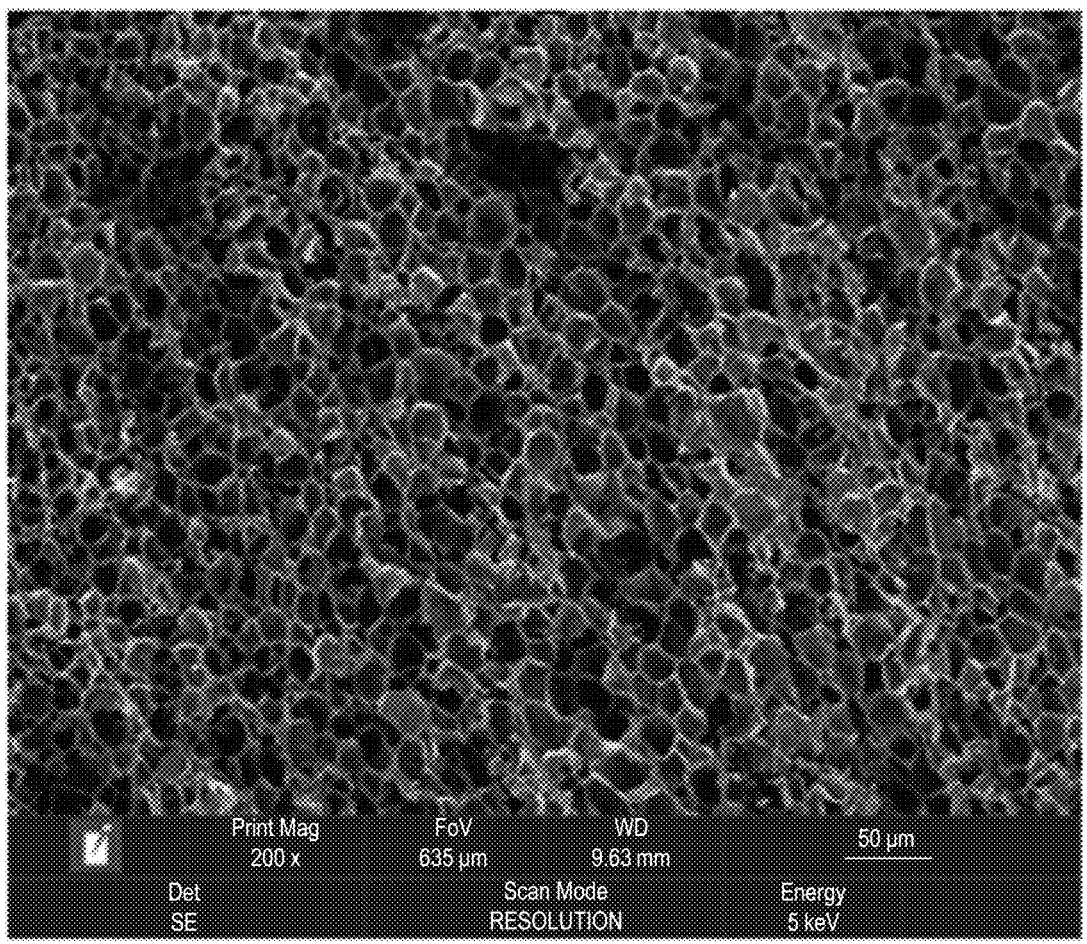
FIG. 3 is a schematic cross-sectional view of the microporous foam material prepared in Comparative Example 1.

The polymer composite board prepared in Example 1, Example 9 and Comparative Example 1 are detected by scanning electron microscope, and the detection results are shown in FIG. 1, FIG. 2 and FIG. 3.

It can be seen from FIG. 1 that the polymer composite board with oriented polymer composite fibers is subjected to fluid foaming, and the obtained microporous foam material has consistent cell orientation and uniform cell size, which is a result of fiber orientation induction effect, the microfibers may serve as the nucleation points of the cells, making the cells grow directionally along the direction of the microfibers to form oriented cells.

It can be seen from FIG. 2 that using nylon 6 as the fiber-forming phase substance may also make it possible to form a microporous foam material with consistent cell orientation and uniform cell size after foaming. However, since the foaming temperature (160° C.) is high, the cell size is large.

It can be seen from FIG. 3 that the cells in the microporous foam material prepared in Comparative Example 1 are randomly distributed without fixed orientation, which is because there is absolutely no entanglement of the polymer composite fibers in the board to form a fiber network dispersed in the PP matrix, and more heterogeneous nucleation points will be generated during the foaming process.

The purpose of the above-mentioned embodiments is to illustrate the substantive content of the present disclosure, but not to limit the protection scope of the present disclosure. Those skilled in the art should understand that the technical solution of the present disclosure can be modified or equivalently replaced without departing from the essence and protection scope of the technical solution of the present disclosure.

What is claimed is:

1. A preparation method of a microporous foam material with oriented cells, comprising the following steps:
   (1) melting and mixing raw materials for preparing a polymer composite material and then thermally stretching the raw materials to obtain polymer composite fibers; wherein the raw materials comprise a polymer matrix, a fiber-forming phase substance and a processing aid;
   (2) arranging the polymer composite fibers prepared in the step (1) in a same direction and then hot-pressing the polymer composite fibers, wherein a hot-pressing temperature is controlled in the hot-pressing process, so that the polymer matrix in the polymer composite fibers is melted, but microfibers in the polymer composite fibers are not melted, thus obtaining a polymer composite board with oriented fibers;
   (3) carrying out a supercritical fluid foaming process on the polymer composite board prepared in the step (2) to obtain a microporous foam material with oriented cells; wherein a temperature is controlled in the supercritical fluid foaming process so that the microfibers in the polymer composite board are not melted.

2. The preparation method of the microporous foam material with the oriented cells according to claim 1, wherein a content of the polymer matrix in the raw materials is 80 wt % to 99 wt %, and a content of the fiber-forming phase substance is 1 wt % to 20 wt %; an amount of the processing aid is 0.1 wt % to 10 wt % of a total weight of the polymer matrix and the fiber-forming phase substance.

3. The preparation method of the microporous foam material with the oriented cells according to claim 1, wherein a temperature of the supercritical fluid foaming process in the step (3) is 130° C. to 165° C., a pressure of the supercritical fluid is 17.90 Mpa to 21.69 Mpa, and a pressure holding treatment time for the supercritical fluid is 0.5 hour to 5 hours.

4. The preparation method of the microporous foam material with the oriented cells according to claim 3, wherein a temperature for melting and mixing in the step (1) is 160° C. to 255° C.; a temperature for the hot-pressing treatment in the step (2) is 180° C. to 200° C.

5. The preparation method of the microporous foam material with the oriented cells according to claim 4, wherein a diameter of the polymer composite fibers is 160 μm to 240 μm.

6. The preparation method of the microporous foam material with the oriented cells according to claim 5, wherein the polymer matrix is polypropylene; the fiber-forming phase substance is polyethylene terephthalate or polyamide; the processing aid is phenoxy polyphosphazene or polyethylene oxide.

7. The preparation method of the microporous foam material with the oriented cells according to claim 6, wherein the raw materials further comprise an antioxidant, and an amount of the antioxidant is 0.1 wt % to 1 wt % of a total weight of the polymer matrix and the fiber-forming phase substance.

* * * * *